Figure 1:
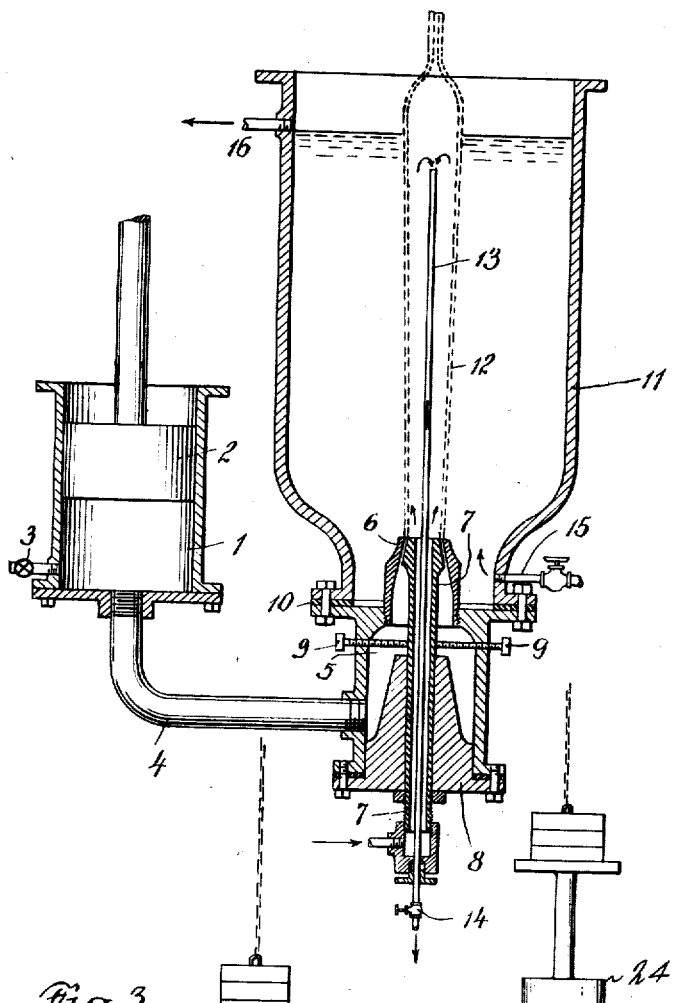

Sept. 28, 1926.

W. F. HENDERSON

SAUSAGE CASING

Filed April 7, 1923

1,601,686

INVENTOR
William F. Henderson
BY
Pennie, Davis, Marvin & Edmonds
ATTORNEYS.

Patented Sept. 28, 1926.

1,601,686

UNITED STATES PATENT OFFICE.

WILLIAM FRANKLIN HENDERSON, OF PITTSBURGH, PENNSYLVANIA, ASSIGNOR, BY MESNE ASSIGNMENTS, TO VISKING CORPORATION, OF CHICAGO, ILLINOIS, A CORPORATION OF VIRGINIA.

SAUSAGE CASING.

Application filed April 7, 1923. Serial No. 630,594.

This invention relates to improvements in edible sausage casings, and includes improvements in the production of such sausage casings, as well as the new sausage casings themselves.

The large demand for meats enclosed in some sort of covering or casing and the changing world conditions upon which the supply of such coverings depends, have made it desirable, particularly in recent years, to devise a meat container, the source of which shall be quite independent of the meat packing industry. The production of natural casings by packers is limited, while the natural casings vary in diameter even in single lengths, thus making a standardized product, or a product of standard size, difficult to attain; while the natural casings are further subject to the criticism concerning sanitation which is always associated with the source from which the casings are produced.

The desirability of supplying a source of coverings or casings independent of the meat packing industry has been accomplished to some extent by the use of woven bags and tubes and other related devices, and it has also been proposed to use seamed and also seamless tubes, of rather thick walls, made from plastic materials. The production of satisfactory seamless tubes, however, which are suitable for use as a container for sausages or wieners, is a difficult problem.

As a result of extended research and investigation, I have found that a satisfactory seamless sausage casing can be produced from specially prepared cellulose hydrate, which is strong, thin-walled, and non-fibrous, which is elastic in character, of acceptable appearance, and which is sufficiently thin and flexible and of other desirable physical properties to permit linking of the sausages therein.

The new sausage casings present many advantages over those made from the intestines of animals. They may be made in practically unlimited amount, thus eliminating any difficulty in securing an adequate supply. Their production is not subject to the criticism concerning sanitation which is associated with the production of the natural product; in fact, all undesirable and distasteful associations concerning the source of the casings are removed. The diameter of the new casings can be controlled and standard sizes produced, thus eliminating the variations of the natural product. The new casings, moreover, are made of a stable, inactive substance, requiring no salting nor refrigeration for their preservation, while they are, nevertheless, edible in every respect and present no difficulties even during mastication. Other attributes and advantages of the new casings will more fully appear from the following more detailed description.

The starting material employed in making the new casings is cellulose. Cellulose is abundant and cheap; it is an edible material, being present in abundance in a large number of our vegetable foodstuffs; it is a stable material, not subject to rapid putrefaction, as is the case with protein materials; and by proper treatment it is capable of conversion into a workable plastic material which can be converted back again into cellulose hydrate, which has similar desirable properties to those of the original cellulose, but which, when properly prepared, presents important additional properties and advantages.

The improved method of the present invention may be considered both from the chemical standpoint and from the mechanical standpoint, although these are related to each other and to a greater or less extent interdependent. So also, the new process may be considered to include two more or less distinct steps; namely, the treatment of the cellulose for the production of viscose therefrom in the form of a workable plastic material of suitable composition and properties, and the treatment of the viscose plastic for the formation of the seamless tubes which can be used as containers for the wieners or sausages.

As the result of my investigations, I have found it important to subject the cellulose to the minimum chemical treatment possible in order to produce a viscose solution or plastic which will give a film or tube of maximum strength. I have found that the viscose solutions made from cellulose to which the minimum treatment was accorded in the production of the viscose possessed the highest viscosity which was attainable, and I have also found that the production of maximum film strength in this way is important for the successful formation of thin, strong tubes for use as sausage casings. When the cellulose is properly treated, however, in the production of the viscose therefrom, and the viscose is further treated for the production of cellulose hydrate by a proper manipulation, it is possible to produce tubes of great strength and considerable elasticity and having other desirable properties. Tubes can thus be produced of a thickness, for example, of around 0.002 to 0.003 inch in thickness, when measured dry and which will, nevertheless, possess greath strength and considerable elasticity, and which will have a texture such that, when wet, the film will become soft and "mushy". The thickness and texture of the casings depend largely upon the mechanical processes employed during the tube formation, while the strength, however, depends primarily upon the chemical processes employed, as above pointed out. Accordingly, in the treatment of the cellulose for making viscose, this treatment is carried out as a minimum treatment to produce a viscose solution of high viscosity, so that the resulting casing will have a high film strength, and the viscose solution is then treated by mechanical methods of treatment for the production of the films or tubes which are caused to revert to cellulose hydrate by a suitable treatment.

When the viscose has been properly ripened, the viscose solution can be extruded without admixture of modifying materials, such as oil. The viscose may, however, have various modifying materials incorporated therewith with but little danger of saponifying or decomposing the modifying material. A small quantity of a suitable vegetable oil or oils may be used and the viscose solution somewhat modified thereby, such oils altering to some extent the texture and elasticity of the casings and giving to the film a desirable opalescence. The presence of an oil in the viscose may also facilitate its extrusion by diminishing any tendency to stick to the metal parts, although I have obtained very satisfactory extrusion without the addition of such oils. A suitable amount of vegetable oil is, for example, 40 parts by weight of cotton seed oil for each 100 parts of cellulose in a solution of viscose which contains 7% by weight of cellulose. The film made from such a solution is softer and more elastic, as well as opalescent in appearance and very similar to the appearance of natural casings.

The method of treating the viscose solution for the formation of seamless tubes therefrom will be further described in connection with the accompanying drawings illustrating certain improved forms of apparatus adapted for the extrusion of the solutions and the treatment of the resulting tubes; but the specific apparatus is intended as illustrative, and the invention is not limited thereto, although I have found apparatus of this character particularly advantageous for use. The invention includes the novel apparatus for carrying out the extrusion, as well as the improved method of extrusion.

Figure 2:
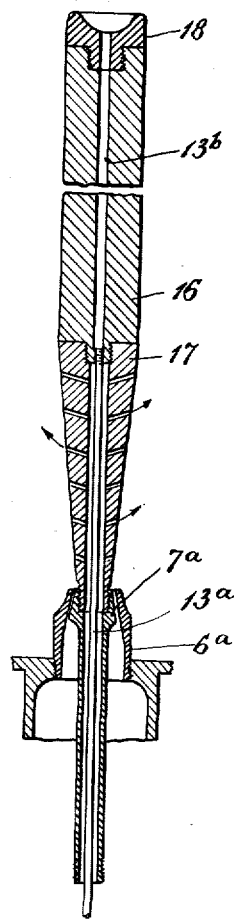
Figure 3:
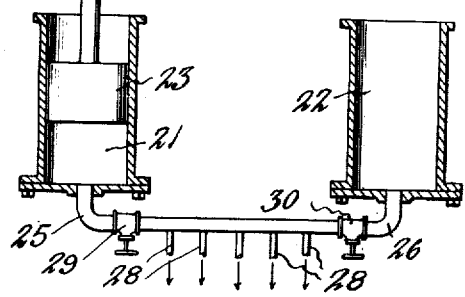

In the accompanying drawings Fig. 1 shows, in a somewhat conventional and diagrammatic manner, and with parts in central vertical section, one form of extrusion apparatus of the invention adapted for the continuous formation of thin-walled tubes; Fig. 2 shows a mandrel adapted for use in the apparatus of Fig. 1; and Fig. 3 shows a somewhat modified form of device for maintaining substantially constant and uniform pressure for the extrusion.

In the apparatus illustrated in Fig. 1 the viscose is extruded through an annular orifice upwardly through a chemical bath, which, with subsequent treatments, converts the viscose back into cellulose hydrate. The parts of the apparatus which are subject to corrosion on exposure to viscose are constructed of a suitable non-corrosive material, such as Monel metal, which is not affected by the viscose or by the baths employed.

The apparatus of Fig. 1 comprises a supply container 1, in which operates a mechanically driven piston 2. The container is supplied with a relief 3 at its bottom, so that, when the piston is raised, air may be sucked in. The supply receptacle 1 communicates by means of a short pipe 4 with the extrusion receptacle 5, on top of which is a nozzle 6, which, with the core 7, forms an annular orifice through which the viscose is extruded. The bottom of the extrusion receptacle consists of a removable cap or member 8, through which the core member 7 is screwed so that it will extend up into the nozzle 6. The exact centering of the core is maintained by set screws located in the wall of the extrusion receptacle, which are indicated at 9.

It will be noted that the top of the core 7 is flush with the top of the nozzle 6, as illustrated in Fig. 1. This arrangement has been found advantageous in giving a smooth extrusion of the viscose.

Mounted on the extrusion member 5 is a container 11 having a water-tight joint 10 between it and the extrusion receptacle 5. This container serves to hold the regenerating liquid into which the viscose tube is extruded. The core 7 is hollow and has an inner drain tube 13 therein, extending upwardly to near the top of the container. Liquid similar to that used in the regenerating bath may be forced up around the drain tube 13 into the casing 12 as it is formed, thus keeping it inflated, and permitting a constant renewal of the internal liquid as well as regulation of its level. As the internal liquid overflows into the drain pipe 13, considerable suction results unless prevented, tending to draw one wall of the casing into the tube. This is overcome by a suitable regulating valve 14, regulating the outflow through the overflow drain pipe. The level of liquid within the casing can be regulated by adjusting this outlet and the rate at which the liquid is supplied through the core 7. The container 11 has an inlet 15, which can also be used as an emergency drain, and an overflow outlet 16, thus permitting a slow change in the outside bath by the constant inflow of a fresh amount of regenerating liquid and the overflow of a corresponding amount of the spent or partly spent liquid.

In the operation of the apparatus of Fig. 1 the viscose is supplied to the container 1 and is forced at a constant pressure through the annular extrusion nozzle into the regenerating bath. As the viscose tube is thus extruded, it is drawn up through the liquid in the bath in which it is initially hardened. This drawing can be accomplished, for example, by passing the casing over a rotating spool (not shown), situated above the bath, which is mechanically driven and the speed of which is coordinated properly with the rate of extrusion.

The diameter of the casing depends not only upon the size of the annular orifice, but more particularly upon the amount of liquid used to distend the casing. The thickness of the wall depends primarily upon the rate of drawing and upon the degree of inflation, as compared with the rate of extrusion.

The thickness of the wall of the casing is not dependent upon the actual distance between the nozzle 6 and the core 7, but a casing having a wall of only about .002 inch in thickness may be made by extruding the viscose from an orifice up to $\frac{1}{16}$-inch wide, and by drawing the tube upward in the manner described, thus stretching the tube until it has the thinness mentioned. The use of a fairly wide orifice has the advantage of practically eliminating the difficulties due to accidental particles which would tend to clog up the opening. It is not necessary, however, to use an orifice as large as $\frac{1}{16}$-inch to obtain a casing of the minimum thickness desired, and the size of the orifice allows of some variation. The drawing up of the casing into and through the precipitating bath causes the precipitation to take place while the casing is under tension, and this is very important in producing casings of very thin walls and of the proper texture.

After the tube has passed through the bath into which it is extruded, it is led into subsequent baths of suitable composition where further chemical treatment and washing complete its preparation. In order that softness of texture may be retained, the casing is finally immersed in a bath of dilute glycerin or ethylene glycol, or other suitable emollient substance possessing hygroscopic properties. It is then ready for packing.

In order to minimize the occurrence of variations in diameter of the casing, a mandrel may advantageously be arranged above the core 7 of the extrusion nozzle and the casing extruded around this mandrel so that the mandrel serves as a support for the casing, and the precipitating solution may be supplied in conjunction therewith so that it will flow around the mandrel. One form of mandrel which may be used in conjunction with an extrusion nozzle similar to that of Fig. 1 is illustrated in Fig. 2. This mandrel, constructed of suitable material resistant to corrosion, such as Monel metal, is mounted on the modified core member $7^a$, which with the nozzle $6^a$, forms an annular orifice similar to that of Fig. 1. The central drain pipe $13^a$ of Fig. 2 is threaded at its upper end into the cylindrical section 16, which has a central passage $13^b$ therein, forming an extension of the drain pipe $13^a$. The mandrel is made up of the cylindrical section 16 and a conical section 17, the conical section being screw threaded at its lower end to the core $7^a$. A plurality of cylindrical sections 16 may be used, the top section terminating in a cap member 18. The conical portion 17 is perforated so that the regenerating liquid will be distributed over the surface of the cone and come in contact with the inner surface of the casing and flow upwardly with the casing and between it and the cylindrical member 16. The exhausted internal liquid overflows at the upper end of the cap 18 and is drained off through the drain tube $13^a$, in a manner similar to that described in connection with Fig. 1. A mandrel such as that illustrated prevents the collapse of the casing in case a small hole occurs in the casing wall, while it also promotes the formation of a casing of uniform diameter. When using the mandrel of Fig. 2 it will be understood that the tube can be extruded in the manner described in connection with Fig. 1, with constant forcing of the viscose solution through the annular orifice into the precipitating bath, and with constant supply of precipitating bath to the inside of the tube around the mandrel as well as constant replenishment of the precipitating bath surrounding the tube to maintain its precipitating properties.

It will be evident that the length of seamless tubing which can be made with the apparatus just described depends upon the capacity of the supply receptacle 1. When only one such receptacle is used, it must sooner or later be refilled and the extrusion process interrupted. In order to make the process continuous, a plurality of supply receptacles of considerable size may be provided, so that, when one supply receptacle is nearly exhausted, a second may be started. A modified construction permitting the maintenance of constant pressure is illustrated somewhat diagrammatically in Fig. 3, in which two supply receptacles 21 and 22 of considerable size are provided, each with a plunger 23 and 24, and both being connected through pipes 25 and 26 with a series of outlet pipes 28, each leading to an extrusion machine similar to that shown in Figs. 1 and 2.

By closing the valve 30 in the pipe 26 and opening the valve 29 in the pipe 25, the contents of the supply receptacle 21 can be forced to the extrusion machine or machines until the supply is nearly exhausted, when the receptacle 22 can be filled and started by opening the valve 30 in the pipe 26. The valve 29 can then be closed and the supply receptacle 21 refilled. By alternating the two cylinders, the operation can be made continuous.

In the diagrammatic illustration of Fig. 3 the pistons are shown as having weights carried at their upper ends for forcing the viscose solution to the extrusion orifice or orifices under a substantially constant pressure. Some slight variations may result due to small increases or decreases in friction in the piping leading to the extrusion machines, but by proper design of the apparatus this will not be of importance in effecting the operation of the apparatus. The weighted pistons serve in effect the same purpose as a pump operating to maintain a constant pressure, and it will be evident that other suitable forcing means may be employed which will serve to maintain a regulated supply of the viscose solution to the extrusion orifices under a regulated pressure.

The bath used for the precipitation or regeneration of the viscose can vary somewhat in its composition and will differ somewhat also with the type of viscose used. In general, I have found it advantageous to use a concentrated solution of a sodium salt as the bath for coagulating the extruded viscose. With thoroughly ripe viscose, a nearly neutral salt solution can be used. If the viscose is under-ripe, a somewhat increased amount of acid is used, but gas bubbles tend to form under these conditions which weaken the film, and it is more advantageous, therefore, to use a thoroughly ripe viscose with a salt solution of lower acidity.

Inasmuch as the viscose is a sodium compound, it is advantageous to use an almost saturated solution of sodium sulfate as the bath and to maintain a slight acidity with sulfuric acid. The interaction of this acid with the viscose produces sodium sulfate, which is the same salt as that of the bath. Sulfur and hydrogen sulfide are also formed, but these are not harmful to the process and can be readily removed if desired. If a neutral salt solution is employed, it soon becomes deep yellow in color and slightly alkaline, and its rapid coagulating power is lessened. It must then be neutralized and filtered. The addition of a small amount of sulfuric acid to the bath, however, maintains the rapid precipitating power of the bath and also keeps the bath clearer. It also prevents the formation of crystals of sodium sulfate, which otherwise tend to form when more sodium ions (from the viscose) are added to the already nearly saturated solution. The maintenance of an acidity of 1% sulfuric acid has been found to be satisfactory. Such a solution precipitates the viscose and merely starts the regeneration. If the extruded tube remains in the bath for several minutes, regeneration will be complete; but this requires a bath of considerable depth, i. e., from 3 to 4 feet deep, and it is more convenient to complete the regeneration by subsequent treatment of the tubes in other baths. The walls of the tubes are, moreover, so thin and porous that they are readily penetrated by the liquids, so that it is unnecessary to apply the treating liquors to the inside of the tubes. The liquids penetrate sufficiently from the outside upon simple immersion to complete the regeneration. The subsequent baths through which the tubes are passed after leaving the precipitating bath may be of similar composition or of somewhat modified composition.

The new sausage casings of the present invention, obtainable in the manner described, are edible, thin-walled, seamless tubes of cellulose hydrate, with which modifying agents, such as oils, etc., may be incorporated, and which are suitable for use as containers for sausages and wieners. The casings are of a minimum thickness, being less than .003 inch in thickness when measured dry. They are edible from the standpoint of chemical composition as well as from a general dietetic standpoint. In fact, they satisfy all dietetic requirements, as well as the important conditions imposed by the packing industry.

Owing to the very thin walls of the new casings, they may readily be masticated without difficulty and consumed with the meat, being perfectly edible and free from objection from chemical, medical and dietetic standpoints. Sausages made with the new casings are also free from objection from a culinary viewpoint. Wieners covered with the new thin-walled casings can be smoked, fried, boiled or cooked with satisfactory results by methods commonly used for such meats. The new casings are, moreover, porous and elastic, yet they possess great strength and have a satisfactory and acceptable appearance. The thinness of the walls of the casings is such that they can be linked, in the manufacture of the sausage therewith, whereas this is not possible with a thick walled casing.

The present invention accordingly provides an improved sausage casing in the form of seamless tubes of cellulose hydrate of such an extreme degree of thinness as to possess the desirable and valuable properties such as comestibility, linkability, elasticity, porosity, etc., which are so desirable in sausage casings, and have sufficient strength to make them commercially usable to advantage in the meat products industry.

The new sausage casings are also made by a new method in which viscose of superior properties is first produced, of high viscosity and by minimum chemical treatment, suitable for use in producing the new thin-walled casings; and the viscose is then treated for the formation of the seamless tubes therefrom. In the continuous method of formation of the thin-walled seamless tubes, the specially prepared viscose is extruded from a specially designed apparatus into a chemical bath, or a series of chemical baths, which cause the viscose to be converted into cellulose hydrate. The extrusion of the tube is effected by forcing it upwardly into a precipitating bath and by simultaneously treating the interior and exterior surfaces of the extruded tube, while renewing the treating liquids so as to maintain the operation substantially continuous over considerable periods of time. In the upward extrusion of the viscose tube into the treating bath, the freshly extruded casing is supported during its upward passage through the bath, either by means of the regenerating liquid itself or by means of a hollow mandrel over which the casing slides and around which the regenerating liquid circulates. In the formation of the tube, the complete treatment may be carried out in a single bath. However, it is more advantageously carried out in a series of baths through which the tubing is passed; and, when such a series of baths is used, the tubing is advantageously treated with the precipitating or regenerating liquid, both interiorly and exteriorly in the first bath, while it may be treated only exteriorly in the successive baths, the thinness and porosity of the thin-walled tube permitting effective action of the successive baths from the outside.

The improved extrusion apparatus of the invention, as will be noted from the foregoing description, comprises an extrusion nozzle and an extrusion bath so arranged that the specially prepared viscose can be extruded upwardly into the bath, and the viscose converted into cellulose hydrate during the drawing of the tube upwards under tension. This upward extrusion is facilitated by the fact that the viscose is lighter than the liquid used in the precipitating bath. The drawing of the casings upwardly from the extrusion nozzle makes it possible to use an extrusion orifice much larger in width than the intended thickness of the casing, and nevertheless to draw out the casing until it becomes sufficiently thin. The supporting of the casing during extrusion, by the liquid or by the mandrel, or by a combination of both, is also advantageous; while this arrangement also enables both the internal and external regenerating liquids to be changed and a substantially continuous extrusion to be carried out over considerable periods of time. The use of a mandrel which supports the casing internally, together with the internal exchange of the regenerating liquid, is particularly advantageous for carrying out the extrusion and for producing casings of great uniformity.

I claim:

1. The improvement in the manufacture of sausage casings which comprises extruding a viscose solution of high viscosity upwardly into a treating bath in the form of a thin-walled seamless tube of a diameter adapted to be used as a sausage casing, stretching the tube during its formation and interiorly supporting the tube during its extrusion.

2. The improvement in the manufacture of sausage casings which comprises extruding a viscose solution upwardly into a treating bath in the form of a thin-walled seamless tube of the diameter of a sausage casing and subjecting the extruded tube to a longitudinal stretching while in the hardening bath.

3. The improvement in the manufacture of sausage casings which comprises extruding a viscose solution upwardly into a treating bath in the form of a thin-walled seamless tube of the diameter of a sausage casing and withdrawing the extruded tube through the treating bath at a speed greater than the speed of extrusion.

4. The improvement in the manufacture of sausage casings which comprises extruding a viscose solution upwardly into a treating bath in the form of a thin-walled seamless tube of the diameter of a sausage casing, withdrawing the extruded tube through the treating bath at a speed greater than the speed of extrusion and supporting the interior of the tube during such extrusion.

5. The improvement in the manufacture of sausage casing which comprises extruding the viscose solution upwardly into a treating bath in the form of a thin-walled seamless tube of the diameter of a sausage casing supporting the interior of the tube during such extrusion by supplying treating solution to the interior of the tube and withdrawing the extruded tube through the treating bath at a speed greater than the extrusion speed.

6. The improvement in the manufacture of sausage casings which comprises extruding a viscose solution upwardly into a treating bath in the form of a thin-walled seamless tube of the diameter of a sausage casing supporting the interior of the tube during such extrusion by causing the extruded tube to pass over a mandrel in the bath and supplying treating solution to the interior of the tube around the mandrel and withdrawing the extruded tube through the treating bath at a speed greater than the extrusion speed.

7. A process for preparing sausage casings which comprises upwardly extruding a viscose solution into a precipitating bath in the form of a seamless tube in such manner that the precipitating bath acts interiorly and exteriorly of the tube, the precipitating bath on the inside of the tube being at all stages of the formation of the latter in the form of a liquid supporting column which substantially fills the interior of the tube.

8. A thin-walled seamless tubular sausage casing of cellulose hydrate, said casing having a thickness of not more than .003 inch when measured dry.

In testimony whereof I affix my signature.

WILLIAM FRANKLIN HENDERSON.

bath in the form of a thin-walled seamless tube of the diameter of a sausage casing supporting the interior of the tube during such extrusion by supplying treating solution to the interior of the tube and withdrawing the extruded tube through the treating bath at a speed greater than the extrusion speed.

6. The improvement in the manufacture of sausage casings which comprises extruding a viscose solution upwardly into a treating bath in the form of a thin-walled seamless tube of the diameter of a sausage casing supporting the interior of the tube during such extrusion by causing the extruded tube to pass over a mandrel in the bath and supplying treating solution to the interior of the tube around the mandrel and withdrawing the extruded tube through the treating bath at a speed greater than the extrusion speed.

7. A process for preparing sausage casings which comprises upwardly extruding a viscose solution into a precipitating bath in the form of a seamless tube in such manner that the precipitating bath acts interiorly and exteriorly of the tube, the precipitating bath on the inside of the tube being at all stages of the formation of the latter in the form of a liquid supporting column which substantially fills the interior of the tube.

8. A thin-walled seamless tubular sausage casing of cellulose hydrate, said casing having a thickness of not more than .003 inch when measured dry.

In testimony whereof I affix my signature.

WILLIAM FRANKLIN HENDERSON.

Certificate of Correction.

It is hereby certified that in Letters Patent No. 1,601,686, granted September 28, 1926, upon the application of William Franklin Henderson, of Pittsburgh, Pennsylvania, for an improvement in " Sausage Casings," errors appear in the printed specification requiring correction as follows: Page 2, line 15, for " 0.002 " read *0.0002*, and line 17, for the misspelled word " greath " read *great;* and that the said Letters Patent should be read with these corrections therein that the same may conform to the record of the case in the Patent Office.

Signed and sealed this 2d day of November, A. D. 1926.

[SEAL.]

WM. A. KINNAN,
*Acting Commissioner of Patents.*

Certificate of Correction.

It is hereby certified that in Letters Patent No. 1,601,686, granted September 28, 1926, upon the application of William Franklin Henderson, of Pittsburgh, Pennsylvania, for an improvement in "Sausage Casings," errors appear in the printed specification requiring correction as follows: Page 2, line 15, for "0.002" read *0.0002*, and line 17, for the misspelled word "greath" read *great;* and that the said Letters Patent should be read with these corrections therein that the same may conform to the record of the case in the Patent Office.

Signed and sealed this 2d day of November, A. D. 1926.

[SEAL.]                             WM. A. KINNAN,
*Acting Commissioner of Patents.*